US012249767B2

(12) United States Patent
Kim et al.

(10) Patent No.: US 12,249,767 B2
(45) Date of Patent: Mar. 11, 2025

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Young Su Lee, Gyeonggi-do (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 111 days.

(21) Appl. No.: 18/096,649

(22) Filed: Jan. 13, 2023

(65) Prior Publication Data

US 2023/0170626 A1 Jun. 1, 2023

Related U.S. Application Data

(63) Continuation of application No. PCT/KR2021/008532, filed on Jul. 6, 2021.

(30) Foreign Application Priority Data

Jul. 17, 2020 (KR) ........................ 10-2020-0089101

(51) Int. Cl.

*H01Q 21/06* (2006.01)
*H01Q 1/24* (2006.01)
*H01Q 21/00* (2006.01)

(52) U.S. Cl.

CPC ........... *H01Q 21/061* (2013.01); *H01Q 1/243* (2013.01); *H01Q 21/0006* (2013.01)

(58) Field of Classification Search

CPC .......... H01Q 1/241; H01Q 1/243; H01Q 1/38; H01Q 1/46; H01Q 1/48; H01Q 1/50; H01Q 7/06; H01Q 21/0006; H01Q 21/061; H01Q 21/065; H01Q 21/08

See application file for complete search history.

(56) References Cited

U.S. PATENT DOCUMENTS

2018/0115084 A1* 4/2018 Tsuchiya .............. H01Q 19/021
2020/0112081 A1* 4/2020 Kim ........................ H01L 24/16
2020/0227835 A1* 7/2020 Kim ..................... H01Q 21/065
2021/0126348 A1* 4/2021 Kim ......................... H01Q 1/38

(Continued)

FOREIGN PATENT DOCUMENTS

CN 104215958 A 12/2014
CN 104237874 A 12/2014

(Continued)

OTHER PUBLICATIONS

International Search Report for PCT/KR2021/008532 mailed on Nov. 8, 2021.

*Primary Examiner* — Raymond R Chai
(74) *Attorney, Agent, or Firm* — The PL Law Group, PLLC

(57) ABSTRACT

An antenna package according to an embodiment includes an antenna device and a flexible circuit board. The antenna device includes a dielectric layer, a first antenna unit arranged on the dielectric layer and a second antenna unit arranged on the dielectric layer to be physically and electrically separated from the first antenna unit. The printed circuit board is coupled to the antenna device to be electrically connected to the first antenna unit, and electrically separated from the second antenna unit.

16 Claims, 6 Drawing Sheets

(56) References Cited

U.S. PATENT DOCUMENTS

| | | | | |
|---|---|---|---|---|
| 2021/0242593 | A1* | 8/2021 | Im | H01L 23/5385 |
| 2023/0019927 | A1* | 1/2023 | Takahashi | H01Q 21/068 |

FOREIGN PATENT DOCUMENTS

| | | | | |
|---|---|---|---|---|
| CN | 108120957 | A | | 6/2018 |
| CN | 215418612 | U | | 1/2022 |
| JP | 2018-074240 | A | | 5/2018 |
| KR | 10-2013-0095451 | A | | 8/2013 |
| KR | 10-2017-0019838 | A | | 2/2017 |
| KR | 10-1962821 | B1 | | 7/2019 |
| KR | 10-2020-0005010 | A | | 1/2020 |
| KR | 10-2020-0010906 | A | | 1/2020 |
| KR | 20200005010 | A | * | 1/2020 |
| KR | 10-2020-0039321 | A | | 4/2020 |
| KR | 20200039321 | A | * | 4/2020 |

* cited by examiner

ANTENNA PACKAGE AND IMAGE DISPLAY DEVICE INCLUDING THE SAME

CROSS-REFERENCE TO RELATED APPLICATION AND CLAIM OF PRIORITY

This application is a continuation application to International Application No. PCT/KR2021/008532 filed on Jul. 6, 2021, which claims the benefit of Korean Patent Application No. 10-2020-0089101 filed on Jul. 17, 2020 at the Korean Intellectual Property Office (KIPO), the entire disclosures of which are incorporated by reference herein.

BACKGROUND

1. Field

The present invention relates to an antenna package and an image display device including the same. More particularly, the present invention relates to an antenna package including an antenna device and a flexible circuit board and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

As mobile communication technologies have been rapidly developed, an antenna capable of operating a high frequency or ultra-high frequency communication corresponding to a communication band of, e.g., 3G, 4G, 5G or more is needed in the image display device.

To implement a radiation driving of the antenna, a flexible circuit board for a feeding and a control signal transmission may be connected to the antenna. The antenna may be connected to, e.g., a driving integrated circuit (IC) chip via a feeding line.

However, the number of feeding lines capable of being connected may be limited due to a spatial or design limit of the driving IC chip. Accordingly, high signaling efficiency and antenna gain of an antenna package may not be easily obtained within a limited space.

For example, Korean Patent Application Publication No. 2013-0095451 discloses an antenna integrated with a display panel, but fails to suggest an antenna construction providing reduced signal loss and improved antenna gain in a high frequency or ultra-high frequency band.

SUMMARY

According to an aspect of the present invention, there is provided an antenna package having improved radiation and operational reliability.

According to an aspect of the present invention, there is provided an image display device including an antenna package with improved radiation and operational reliability.

(1) An antenna package including: an antenna device including a dielectric layer;

a first antenna unit arranged on the dielectric layer; and a second antenna unit arranged on the dielectric layer to be physically and electrically separated from the first antenna unit; and a printed circuit board coupled to the antenna device to be electrically connected to the first antenna unit, and electrically separated from the second antenna unit.

(2) The antenna package of the above (1), wherein the printed circuit board includes a core layer and a feeding line formed on one surface of the core layer and electrically connected to the first antenna unit.

(3) The antenna package of the above (2), wherein the first antenna unit includes a first radiator, a first transmission line extending from the first radiator and a first signal pad connected to one end portion of the first transmission line to be electrically connected to the feeding line.

(4) The antenna package of the above (3), wherein the core layer covers the first signal pad of the first antenna unit in a planar view and does not cover the second antenna unit.

(5) The antenna package of the above (3), wherein the second antenna unit includes a second radiator, a second transmission line extending from the second radiator and a second signal pad connected to one end portion of the second transmission line.

(6) The antenna package of the above (5), wherein the core layer entirely covers the first signal pad and at least partially cover the second signal pad in a planar view.

(7) The antenna package of the above (5), wherein the first antenna unit further includes a first ground pad disposed around the first signal pad to be separated from the first transmission line and the first signal pad, and the second antenna unit further includes a second ground pad disposed around the second signal pad to be separated from the second transmission line and the second signal pad.

(8) The antenna package of the above (7), wherein the core layer covers the first signal pad and the first ground pad of the first antenna unit, and the second ground pad of the second antenna unit in a planar view.

(9) The antenna package of the above (8), wherein the core layer does not cover the second signal pad of the second antenna unit in the planar view.

(10) The antenna package of the above (7), wherein the printed circuit board further includes a first bonding pad formed on the one surface of the core layer and bonded to the first ground pad.

(11) The antenna package of the above (11), wherein the printed circuit board further includes a second bonding pad formed on the one surface of the core layer and bonded to the second ground pad.

(12) The antenna package of the above (1), wherein the first antenna unit includes a plurality of first antenna units forming a first antenna unit row.

(13) The antenna package of the above (12), wherein the second antenna unit is disposed to be adjacent to one end or both ends of the first antenna unit row.

(14) The antenna package of the above (12), further including a dummy pattern disposed between neighboring first antenna units of the plurality of first antenna units.

(15) The antenna package of the above (14), wherein the dummy pattern includes a plurality of floating dummy patterns independently arranged in spaces between the first antenna units and a space between the first antenna unit and the second antenna unit.

(16) The antenna package according to the above (1), wherein the first antenna unit and the second antenna unit have the same shape and structure.

(17) An image display device including the antenna package according to embodiments as described above.

According to exemplary embodiments of the present invention, an antenna unit row including a first antenna unit and a second antenna unit may be disposed on a dielectric layer of an antenna device. The first antenna unit may be connected to a driving IC chip via a feeding line of a printed circuit board (FPCB), and the second antenna unit may be electrically and physically separated from the first antenna unit and electrically separated from the flexible circuit board.

An antenna radiation may be added by the second antenna unit from an electric field remaining in a core layer of the printed circuit board and/or the dielectric layer of the antenna device. Accordingly, an auxiliary radiation or sub-radiation may be added without an additional connection of a feeding line, so that an overall gain of the antenna device may be increased.

Therefore, even when the number of leads or pads available in the driving IC chip is limited, sufficient antenna gain may be achieved by using the second antenna unit.

In some embodiments, the second antenna unit may be disposed to be adjacent to a lateral portion or an end portion of the antenna unit row to maintain a continuity of the antenna radiation while preventing a reduction of radiation at a lateral portion or an end portion of an image display device.

DETAILED DESCRIPTION OF THE EMBODIMENTS

According to exemplary embodiments of the present invention, there is provided an antenna package including an antenna device and a printed circuit board. The antenna device may include a first antenna unit and a second antenna unit and the printed circuit board may be electrically connected to the first antenna unit to provide an improved antenna gain.

An image display device including the antenna package is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms “first”, “second”, “upper”, “lower”, “end”, “top”, “bottom”, etc., used in this application are not intended to designate an absolute position, but to relatively distinguish between different elements and positions.

The term “electrically connected” used in this application indicates a direct connection and a connection via another conductor or wiring between different electrical elements.

Figure 1:
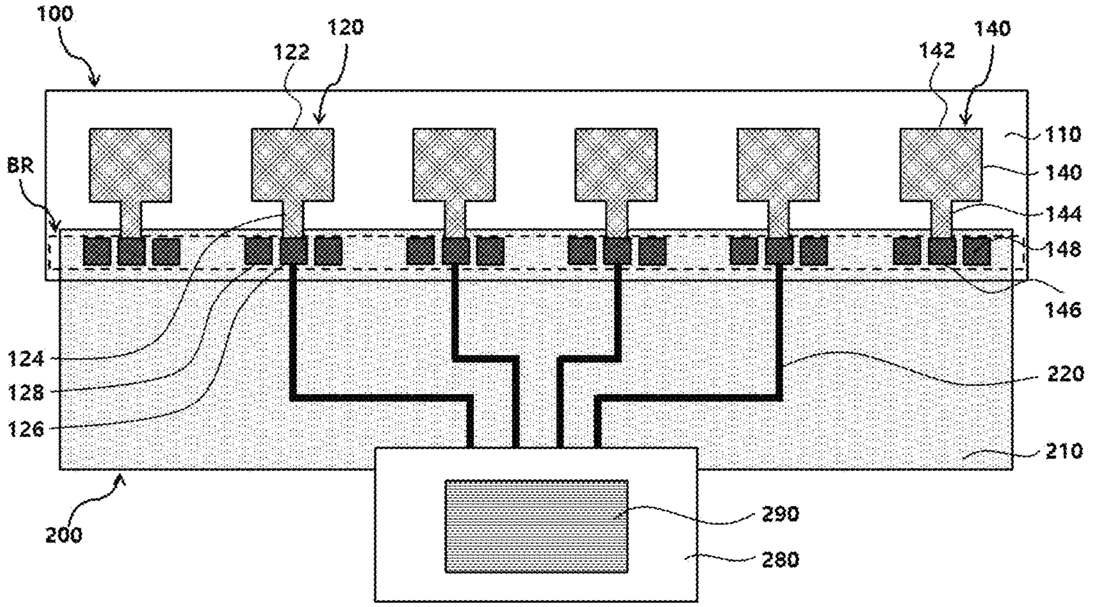
FIGS. 1 and 2 are schematic top planar views illustrating antenna packages in accordance with exemplary embodiments.
Figure 2:
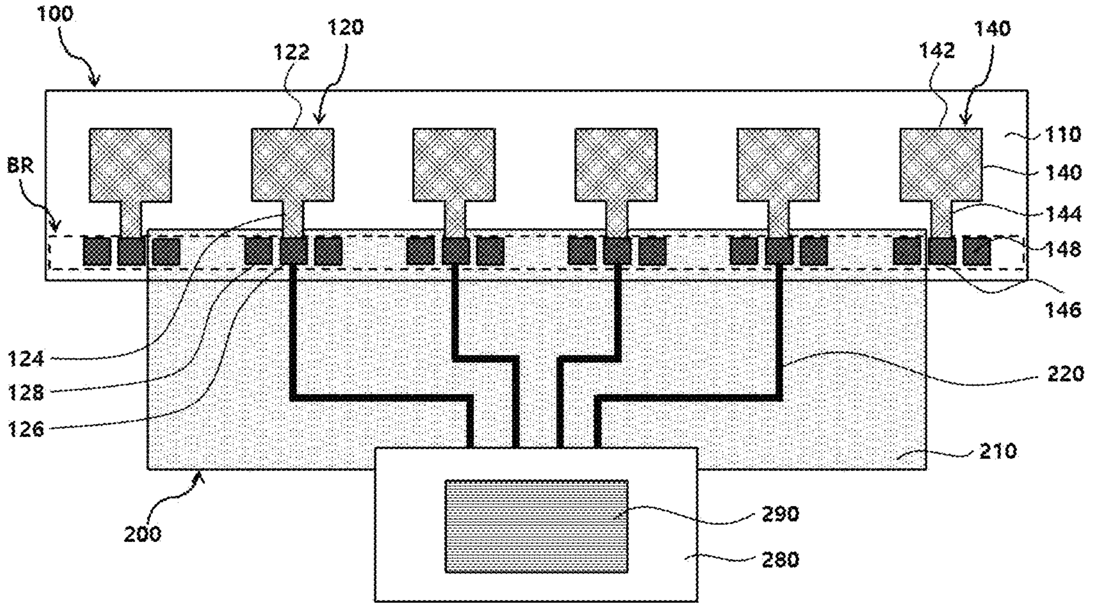
Figure 3:
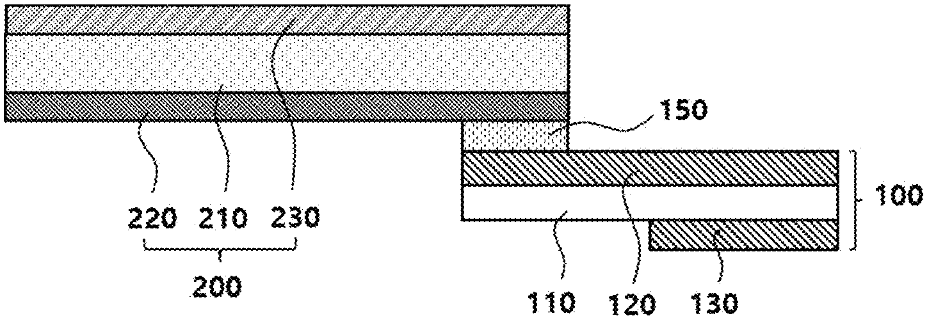
FIG. 3 is a schematic cross-sectional view illustrating an antenna package in accordance with exemplary embodiments.

FIGS. 1 and 2 are schematic top planar views illustrating antenna packages in accordance with exemplary embodiments. FIG. 3 is a schematic cross-sectional view illustrating an antenna package in accordance with exemplary embodiments.

Referring to FIGS. 1 and 2, the antenna package includes an antenna device 100 and a printed circuit board 200 .

The antenna device 100 may include a dielectric layer 110 and antenna unit 120 and 140 disposed on the dielectric layer 110.

The dielectric layer 110 may include, e.g., a transparent resin film such as a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

The dielectric layer 110 may include an adhesive material such as an optically clear adhesive (OCA), an optically clear resin (OCR), or the like. In some embodiments, the dielectric layer 110 may include an inorganic insulating material such as glass, silicon oxide, silicon nitride, silicon oxynitride, etc.

In some embodiments, a dielectric constant of the dielectric layer 110 may be adjusted in a range from about 1.5 to about 12. When the dielectric constant exceeds about 12, a driving frequency may be excessively decreased, so that driving in a desired high frequency or ultrahigh frequency band may not be implemented.

The antenna units 120 and 140 may be formed on a top surface of the dielectric layer 110. For example, a plurality of the antenna units 120 and 140 may be formed in an array form along a width direction of the dielectric layer 110 or the antenna package.

In some embodiments, when a wavelength corresponding to a resonance frequency of the antenna unit 120 and 140 is λ, an interval between the antenna units 120 and 140 neighboring each other may be from 0.4λ to 1.5λ, preferably from 0.5λ to λ.

Within the above range of the interval between the antenna units 120 and 140, for example, radiation interference or signal interference between radiators 122 and 142 may be suppressed to improve radiation reliability and directivity at a desired frequency band. Further, radiation concentration may be improved to increase an antenna gain.

In exemplary embodiments, the antenna units 120 and 140 may include first antenna units 120 and second antenna units 140.

For example, the first antenna units 120 may be repeatedly and regularly arranged on the dielectric layer 110 to form a first antenna unit row. In this case, a uniform power supply may be implemented to the first antenna units 120 through a feeding line 220, so that antenna signaling efficiency and driving property may be improved and operational reliability may also be improved.

In exemplary embodiments, the second antenna unit 140 may be disposed to be adjacent to one end or both ends of the first antenna unit row. In this case, the second antenna unit 140 may be coupled to a current or an electrical field remaining in a core layer 210 and the dielectric layer 110 when the power supply is performed to the first antenna unit 120 via the feeding line 220.

Thus, sub-radiation or auxiliary-radiation through the second antenna unit 140 may be added to a main radiation through the first antenna unit 120 without an additional electrical connection structure through the feeding line 220. Accordingly, a total amount of antenna gain from the antenna device 100 may be increased.

The second antenna unit 140 may serve as a floating radiator or a sub-radiator independent from, e.g., the electrical connection through the printed circuit board 200.

In some embodiments, an antenna unit row including the first antenna unit 120 and the second antenna unit 140 arranged in the width direction may be formed on the dielectric layer 110. In some embodiments, a plurality of the first antenna units 120 may be arranged between a pair of the second antenna units 140.

The first antenna unit 120 may include a first radiator 122 and a first transmission line 124. The second antenna unit 140 may include a second radiator 142 and a second transmission line 144. The radiators 122 and 142 may have, e.g., a polygonal plate shape, and the first and second transmission lines 124 and 144 may extend from one side or one end of each of the first and second radiators 122 and 142. The transmission lines 124 and 144 may be formed as a single member substantially integral with the radiators 122 and 142.

The first antenna unit 120 and the second antenna unit 140 may further include a first signal pad 126 and a second signal pad 146, respectively. The first signal pad 126 and the second signal pad 146 may be connected to one end portions of the first transmission line 124 and the second transmission line 144, respectively.

In some embodiments, the signal pads 126 and 146 may be formed as a substantially integral member with the transmission lines 124 and 144, and terminal end portions of the transmission lines 124 and 144 ay sere as the signal pads 126 and 146.

In some embodiments, ground pads 128 and 148 may be disposed around the signal pads 126 and 146. For example, a pair of first ground pads 128 may be disposed to face each other with the first signal pad 126 interposed therebetween. A pair of second ground pads 148 may be disposed to face each other with the second signal pad 146 interposed therebetween. The ground pads 128 and 148 may be electrically and physically separated from the transmission lines 124 and 144 and the signal pads 126 and 146.

In some embodiments, the antenna units 120 and 140 or the radiators 122 and 142 may provide signal transmission/reception in a high frequency or ultra-high frequency band (e.g., a 3G, 4G, 5G or higher communication). In a non-limiting example, a resonance frequency of the antenna unit 120 and 140 may be from about 20 to 45 GHz.

The antenna units 120 and 140 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof In an embodiment, the antenna units 120 and 140 may include silver (Ag) or a silver alloy (e.g., silver-palladium-copper (APC)), or copper (Cu) or a copper alloy (e.g., a copper-calcium (CuCa)) to implement a low resistance and a fine line width pattern.

The antenna units 120 may include a transparent conductive oxide such indium tin oxide (ITO), indium zinc oxide (IZO), zinc oxide (ZnOx), indium zinc tin oxide (IZTO), etc.

In some embodiments, the antenna units 120 and 140 may include a stacked structure of a transparent conductive oxide layer and a metal layer. For example, the antenna unit 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, the signal pad 126 and 146 and the ground pad 128 and 148 may be solid patterns formed of the above-described metal or alloy in consideration of reduction of a feeding resistance, improvement of noise absorption efficiency, etc.

In exemplary embodiments, the first antenna unit 120 and the second antenna unit 140 may have substantially the same shape and structure.

In this case, the first antenna unit 120 and the second antenna unit 140 may be formed on the dielectric layer 110 by a substantially single etching process. Additionally, lengths of the radiators 122 and 142 may be maintained substantially uniformly, thereby maintaining a desired antenna resonance frequency as being constant.

The printed circuit board 200 may include a core layer 210 and the feeding line 220 formed on the core layer 210. The core layer 210 may include, e.g., a flexible resin such as a polyimide resin, a modified polyimide (MPI), an epoxy resin, polyester, a cycloolefin polymer (COP), a liquid crystal polymer (LCP), or the like. The core layer 210 may include an internal insulating layer included in the printed circuit board 200.

The feeding line 220 may include, e.g., a microstrip line, a strip line, a CPW (coplanar waveguide line) line, or a GCPW (ground coplanar waveguide) line.

In exemplary embodiments, the printed circuit board 200 may be disposed on one surface of the core layer 210 , and may further include a coverlay film covering the feeding line 220 .

In exemplary embodiments, the core layer 210 of the printed circuit board 200 may cover the first signal pad 126 of the first antenna unit 120 in a planar direction.

In some embodiments, the printed circuit board 200 may also overlap the second antenna unit 140 in a planar view. For example, the core layer 210 may entirely cover the first signal pad 126 in a planar view and cover at least a portion of the second signal pad 146. In this case, the coupling of the current generated when a feeding is performed to the first antenna unit 120 with the second antenna unit 140 through the core layer 210 may be further promoted.

As illustrated in FIG. 2, in some embodiments, the core layer 210 may be superimposed over the first signal pad 126, the first ground pad 128, and the second ground pad 148 of the second antenna unit 120 in a planar view.

The feeding line 220 may be connected or bonded to the first signal pad 126 of the first antenna unit 120. For example, one end portion of the feeding line 220 may be exposed by partially removing the coverlay film of the printed circuit board 200. The exposed one end portion of the feeding line 220 may be bonded to the first signal pad 126.

For example, a conductive intermediate structure 150 (see FIG. 3) such as an anisotropic conductive film (ACF) may be attached on the first signal pads 126, and then a bonding region BR of the flexible circuit board 200 at which the one end portions of the feeding lines 220 are located may be disposed on the conductive intermediate structure 150. Thereafter, the bonding region BR of the printed circuit board 200 may be attached to the antenna device 100 by heating and pressurizing process such that the feeding line 220 may be electrically connected to the first signal pad 126.

As illustrated in FIGS. 1 and 2, each of the feeding lines 220 may be individually and independently connected to each of the first antenna units 120. Accordingly, power/driving control may be independently performed for each of the first antenna units 120. For example, different phase signals may be applied to the first antenna units 120 through the feeding lines 220 connected to each of the first antenna units 120.

In some embodiments, the core layer 210 may not cover the second signal pad 146 of the second antenna unit 140 in a planar view. In this case, for example, an electric field to the first antenna units 120 serving as a main antenna may be more concentrated, and a secondary radiation generated by an indirect coupling of the second antenna unit 140 may be added. .

The feeding line 220 may be physically and electrically separated from the second signal pad 146 of the second antenna unit 140. As described above, for example, the current generated when a power supply is performed to the first antenna unit 120 through the feeding line 220 extending from the driving IC chip 290 may be coupled to the second antenna unit 140 through the core layer 210 or the dielectric layer 110 so that a radiation may also be generated from the second radiator 142.

Thus, the sub-radiation or the auxiliary radiation may be added even without an additional feeding line connected to the second radiator 142. Accordingly, an antenna gain may be increased without changing the number/arrangement of connection leads, connection pads or connection channels included in the driving IC chip 290.

In exemplary embodiments, an intermediate circuit board 280 may be disposed on the printed circuit board 200, and the driving IC chip 290 may be mounted on the intermediate circuit board 280 by, e.g., a surface mount technology (SMT).

The term "intermediate circuit board" used herein may refer generically to a circuit structure or a circuit board positioned between the printed circuit board 200 and the driving IC chip 290.

For example, the intermediate circuit board 280 may include a main board of an image display device, a rigid printed circuit board and various antenna package boards.

If the intermediate circuit board 280 is the rigid printed circuit board, the intermediate circuit board 280 may have higher strength or lower ductility than that of the printed circuit board 200. Accordingly, a mounting stability of the driving IC chip 290 may be improved. For example, the intermediate circuit board 280 may include a core layer formed of a resin (e.g., prepreg) impregnated with an inorganic material such as a glass fiber, and intermediate circuits formed in the core layer.

Feeding and driving signals may be applied from the driving IC chip 290 to the first antenna unit 120 through the feeding line 220. For example, the printed circuit board 200 may further include a circuit or a contact electrically connecting the driving IC chip 290 and the feeding line 220.

Referring to FIG. 3, a ground layer 230 may be disposed on an opposite surface or a top surface of the core layer 210. The ground layer 230 may commonly cover the feeding lines 220 in a planar view. Noise and signal interference around the feeding line 220 may be absorbed or shielded by the ground layer 230. Additionally, generation of an electric field from the feeding line 220 may be facilitated by the ground layer 230, thereby improving signal transmission efficiency.

In some embodiments, the antenna ground layer 130 may be formed on a bottom surface of the dielectric layer 110. The antenna ground layer 130 may overlap the radiators 122 and 142 of the antenna units 120 and 140 in a planar view. A substantially vertical radiation antenna may be implemented by generating an electric field between the radiators 122 and 142 and the antenna ground layer 130 .

In some embodiments, the antenna ground layer 130 may entirely cover the radiators 122 and 142 in the planar view and may not overlap the pads 126, 128 , 146 and 148.

The antenna ground layer 130 may be included as a separate element of the antenna device 100. In some embodiments, a conductive member of a display device to which the antenna device 100 is applied may serve as the antenna ground layer.

The conductive member may include, e.g., a gate electrode of a thin film transistor (TFT) included in a display panel, various wirings such as a scan line and a data line, or various electrodes such as a pixel electrode and a common electrode.

In an embodiment, various structures including a conductive material disposed under the display panel may serve as the antenna ground layer 130. For example, a metal plate (e.g., a stainless-steel plate such as a SUS plate), a pressure sensor, a fingerprint sensor, an electromagnetic wave shielding layer, a heat dissipation sheet, a digitizer, etc. may serve as the antenna ground layer 130.

The above-described feed line 220, the ground layer 230, and the antenna ground layer 130 may include the above-described metal and/or alloy.

Figure 4:
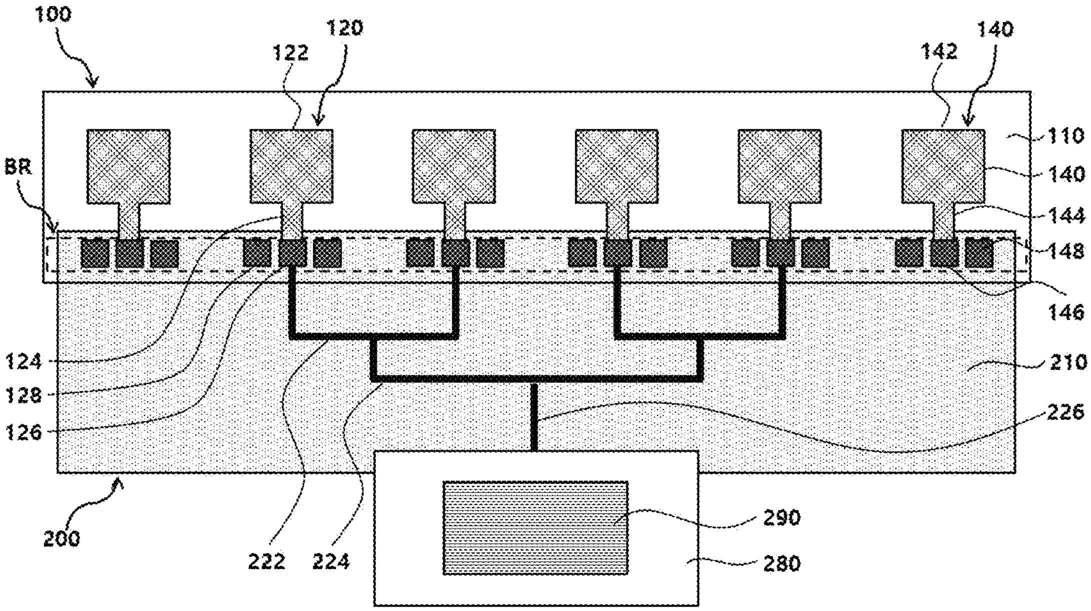
FIG. 4 is a schematic top planar view illustrating an antenna package in accordance with exemplary embodiments.

FIG. 4 is a schematic top planar view illustrating an antenna package in accordance with exemplary embodiments.

Referring to FIG. 4, a plurality of the first antenna units 120 may be coupled through a feed line. For example, the feed line may include merging lines 222 and 224 and a driving signal line 226 integrally connected to each other.

The merging lines 222 and 224 may be disposed on a bottom surface of the core layer 210 and may include a first merging line 222 and a second merging line 224. The first merging line 222 may be bonded to the first signal pad 126 of the first antenna unit 120. For example, two first antenna units 120 may be coupled by the first merging line 222 to form a radiation group. The second merging line 224 may be connected to a plurality of the first merging lines 222 to couple a plurality of the radiation groups.

One end portion of the driving signal line 226 may be branched from the second merging line 224. The driving signal wiring 226 may extend on the bottom surface of the core layer 210, and an opposite end portion of the driving signal line 226 may be electrically connected to the driving IC chip 290.

The coupling structure of the antenna unit 110 illustrated in FIG. 4 is an exemplary embodiment, and may be appropriately modified in consideration of a size and a radiation shape of the antenna device.

Figure 5:
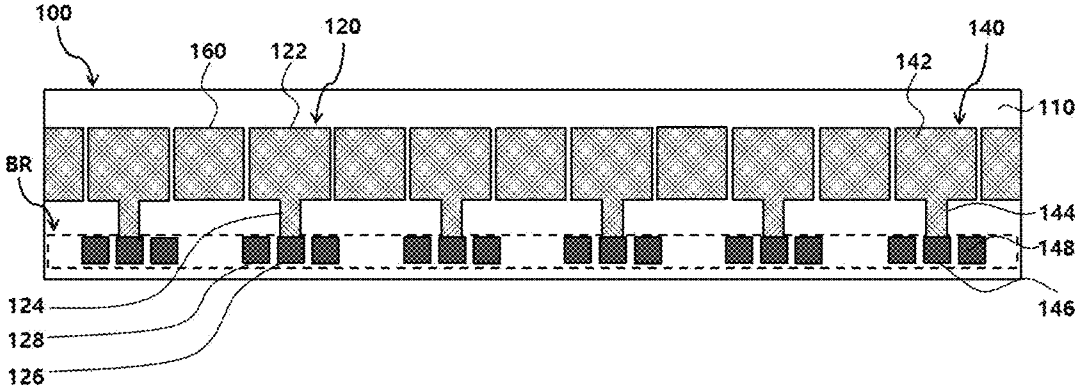
FIG. 5 is a schematic top planar view illustrating an antenna package in accordance with some exemplary embodiments.

FIG. 5 is a schematic top planar view illustrating an antenna package in accordance with some exemplary embodiments.

Referring to FIG. 5, a dummy pattern 160 may be formed between neighboring radiators 122 and 142.

In some embodiments, the radiators 122 and 142 may include a mesh pattern structure. In this case, the dummy pattern 160 may also include a mesh pattern structure.

As illustrated in FIG. 5, the dummy pattern 160 may serve as a floating dummy pattern independently arranged in a space between the neighboring first antenna units 120 and/or in a space between the first antenna unit 120 and the second antenna unit 140.

The dummy pattern 160 may be disposed around the radiators 122 and 142 so that a visual recognition of patterns due to a distribution deviation of conductive patterns. Additionally, the dummy pattern 160 may serve as the independent floating pattern, so that a current absorbance and a radiation disturbance by the dummy pattern 160 may be reduced or suppressed.

Figure 6:
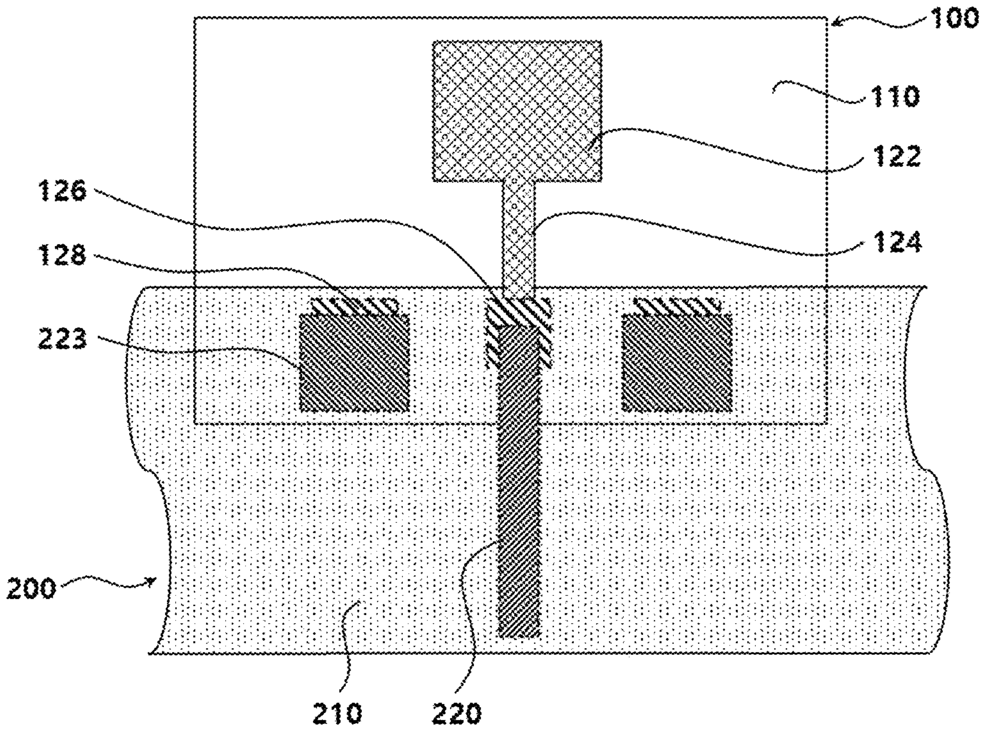
FIGS. 6 and 7 are a schematic top planar view and a schematic cross-sectional view, respectively, illustrating an antenna package in accordance with some exemplary embodiments.
Figure 7:
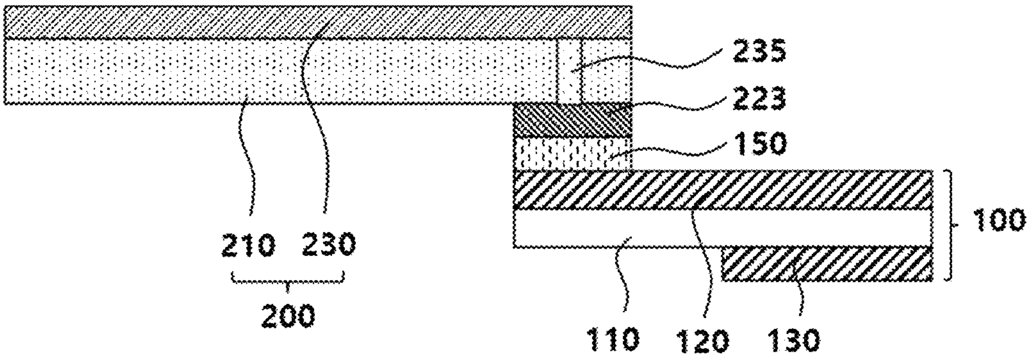

FIGS. 6 and 7 are a schematic top planar view and a schematic cross-sectional view, respectively, illustrating an antenna package in accordance with some exemplary embodiments.

Referring to FIGS. 6 and 7, the printed circuit board 200 may include a first bonding pad disposed in the bonding region BR and bonded to the first ground pad 128 of the first antenna unit 120.

For example, a pair of the first bonding pads 223 may be disposed on one surface of the core layer 210 with the feeding line 220 interposed therebetween, and may be electrically and physically separated from the feed wire 220. The first bonding pad 223 may be bonded to the first ground pad 128 included in the first antenna unit 120 by the conductive intermediate structure 150.

In some embodiments, the printed circuit board 200 may further include a contact 235 electrically connecting the ground layer 230 and the first bonding pad 223.

Figure 8:
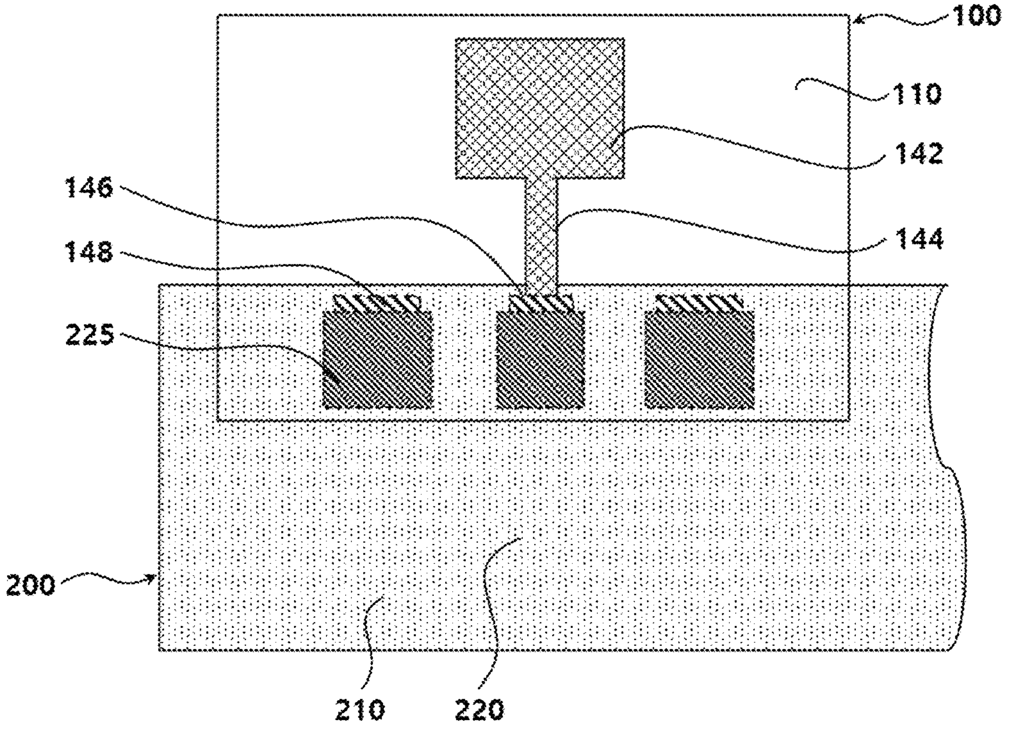
FIG. 8 is a schematic top planar view illustrating an antenna package in accordance with some exemplary embodiments.

FIG. 8 is a schematic top planar view illustrating an antenna package in accordance with some exemplary embodiments.

Referring to FIG. 8, the printed circuit board 200 further includes a second bonding pad 225 disposed in the bonding region BR and bonded to the second signal pad 146 and the second ground pads 148.

In some embodiments, the conductive intermediate structure 150 may extend to cover the second signal pad 146 and the second ground pads 148. In this case, for example, the second bonding pads 225 may be bonded to the second signal pad 146 and the second ground pads 148 via the conductive intermediate structure 150.

For example, the bonding pads 223 and 225 may be disposed on the extended conductive intermediate structure 150, and then attached to the antenna device 100 by a heating/pressurizing process. Accordingly, a bonding stability of the antenna device 100 to the printed circuit board 200 may be further improved. Further, a current or an electric field remaining in the core layer 210 when the feeding is performed to the first antenna unit 120 may be more efficiently coupled with the second antenna unit 140 through the conductive intermediate structure 150 and the second bonding pad 225.

Figure 9:
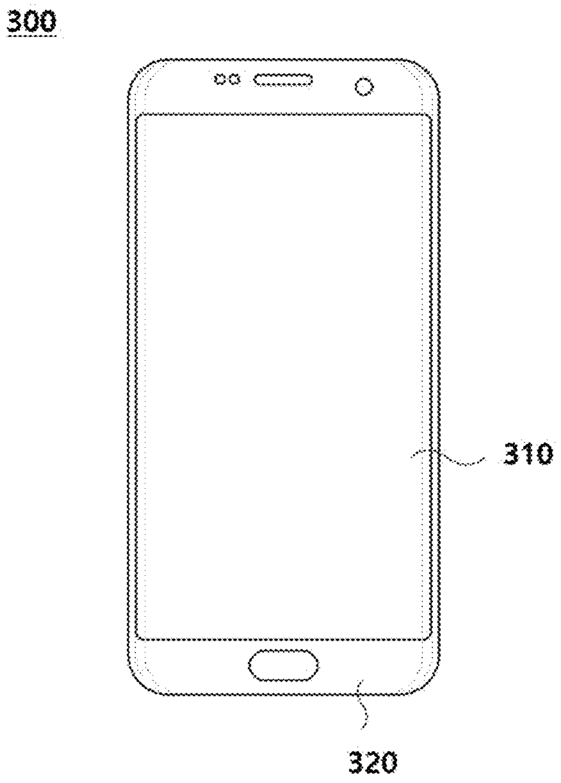
FIG. 9 is a schematic top planar view illustrating an image display device in accordance with exemplary embodiments.

FIG. 9 is a schematic top planar view illustrating an image display device in accordance with exemplary embodiments.

Referring to FIG. 9, an image display device 300 may be fabricated in the form of, e.g., a smart phone, and FIG. 9 shows a front face portion or a window surface of the image display device 300. The front face portion of the image display device 300 may include a display area 310 and a peripheral area 320. The peripheral area 320 may correspond to, e.g., a light-shielding portion or a bezel portion of an image display device.

The antenna device 100 included in the above-described antenna package may be disposed toward the front face portion of the image display device 300, and may be disposed on, e.g., a display panel. In an embodiment, the radiators 122 and 142 may be at least partially superimposed over the display area 310 in a planar view.

In exemplary embodiments, the second radiators 142 of the second antenna unit 140 may be adjacent to one end or both ends of the first antenna unit row. Accordingly, a radiation reduction at lateral or end portions of the image display device 300 may be prevented.

In some embodiments, the radiators 122 and 142 may have a mesh-pattern structure, and a decrease in transmittance due to the radiator 122 and 142 may be prevented. The driving IC chip 290 included in the antenna package may be disposed in the peripheral area 320 to prevent an image degradation in the display area 310.

As described above, the antenna device 100 may include the second antenna unit 140 electrically and physically separated from the first antenna unit 120 and the feeding line 220. Accordingly, even when the number of leads or pads capable of being accommodated in the driving IC chip 290 is limited, improved radiation performance and antenna gain may be achieved.

What is claimed is:

1. An antenna package, comprising:

an antenna device comprising:

a dielectric layer;

a first antenna unit arranged on the dielectric layer;

a second antenna unit arranged on the dielectric layer to be physically and electrically separated from the first antenna unit; and an antenna ground layer disposed on a bottom surface of the dielectric layer; and a printed circuit board coupled to the antenna device to be electrically connected to the first antenna unit, and electrically separated from the second antenna unit, wherein the first antenna unit comprises a first radiator, a first transmission line extending from the first radiator and a first signal pad connected to one end portion of the first transmission line, the first radiator, the first transmission line and the first signal pad are disposed at the same layer, the second antenna unit comprises a second radiator, a second transmission line extending from the second radiator and a second signal pad connected to one end portion of the second transmission line, the second radiator, the second transmission line and the second signal pad are disposed at the same layer, and the antenna ground layer overlaps the first radiator and the second radiator in a planar view, and does not overlap the first signal pad and the second signal pad in the planar view.

2. The antenna package of claim 1, wherein the printed circuit board comprises a core layer and a feeding line formed on one surface of the core layer and electrically connected to the first antenna unit.

3. The antenna package of claim 2, wherein the first signal pad of the first antenna unit is electrically connected to the feeding line.

4. The antenna package of claim 3, wherein the core layer covers the first signal pad of the first antenna unit in a planar view and does not cover the second antenna unit.

5. The antenna package of claim 3, wherein the core layer entirely covers the first signal pad and at least partially covers the second signal pad in a planar view.

6. The antenna package of claim 3, wherein the first antenna unit further comprises a first ground pad disposed around the first signal pad to be separated from the first transmission line and the first signal pad, and the second antenna unit further comprises a second ground pad disposed around the second signal pad to be separated from the second transmission line and the second signal pad.

7. The antenna package of claim 6, wherein the core layer covers the first signal pad and the first ground pad of the first antenna unit, and the second ground pad of the second antenna unit in a planar view.

8. The antenna package of claim 7, wherein the core layer does not cover the second signal pad of the second antenna unit in the planar view.

9. The antenna package of claim 6, wherein the printed circuit board further comprises a first bonding pad formed on the one surface of the core layer and bonded to the first ground pad.

10. The antenna package of claim 1, wherein the printed circuit board further comprises a second bonding pad formed on the one surface of the core layer and bonded to the second ground pad.

11. The antenna package of claim 1, wherein the first antenna unit comprises a plurality of first antenna units forming a first antenna unit row.

12. The antenna package of claim 11, wherein the second antenna unit is disposed to be adjacent to one end or both ends of the first antenna unit row.

13. The antenna package of claim 11, further comprising a dummy pattern disposed between neighboring first antenna units of the plurality of first antenna units.

14. The antenna package of claim 13, wherein the dummy pattern comprises a plurality of floating dummy patterns independently arranged in spaces between the first antenna units and a space between the first antenna unit and the second antenna unit.

15. The antenna package according to claim 1, wherein the first antenna unit and the second antenna unit have the same shape and structure.

16. An image display device comprising:

a display panel; and the antenna package of claim 1 disposed on the display panel.

* * * * *